United States Patent
Augusty

(10) Patent No.: US 10,787,118 B2
(45) Date of Patent: Sep. 29, 2020

(54) REAR TAIL LAMP WITH INTEGRATED WINDOW FOR LIGHTING A DEPLOYED TAILGATE

(71) Applicant: Ford Global Technologies, LLC, Dearborn, MI (US)

(72) Inventor: Andrew Augusty, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/137,657

(22) Filed: Sep. 21, 2018

(65) Prior Publication Data
US 2020/0094736 A1 Mar. 26, 2020

(51) Int. Cl.
| | | |
|---|---|---|
| B60Q 3/30 | (2017.01) | |
| F21K 9/64 | (2016.01) | |
| B60Q 1/24 | (2006.01) | |
| B60Q 1/56 | (2006.01) | |
| B62D 33/03 | (2006.01) | |
| F21V 5/04 | (2006.01) | |
| B60Q 1/124 | (2006.01) | |

(52) U.S. Cl.
CPC .............. *B60Q 3/30* (2017.02); *B60Q 1/124* (2013.01); *B60Q 1/56* (2013.01); *B62D 33/03* (2013.01); *F21K 9/64* (2016.08); *F21V 5/04* (2013.01)

(58) Field of Classification Search
CPC .... B60Q 3/30; B60Q 1/24; B60Q 1/56; F21K 9/64; B62D 33/03; F21V 5/04
See application file for complete search history.

(56) References Cited

U.S. PATENT DOCUMENTS

| | | | |
|---|---|---|---|
| 4,777,569 A | 10/1988 | Wen | |
| 4,896,136 A | 1/1990 | Hotovy | |
| 5,678,914 A | 10/1997 | Dealey et al. | |
| 6,238,068 B1 | 5/2001 | Farmer, Jr. | |
| 6,350,049 B1 | 2/2002 | Zimmermann et al. | |
| 8,281,967 B2 | 10/2012 | Evans | |
| 9,809,160 B2 | 11/2017 | Salter et al. | |
| 9,815,402 B1 * | 11/2017 | Salter | B60Q 3/30 |
| 2009/0115222 A1 * | 5/2009 | Hohnl | B60Q 3/30 296/183.1 |

FOREIGN PATENT DOCUMENTS

DE 102011016395 A1 10/2012

OTHER PUBLICATIONS

2017 Nissan Titan XD SL, Retrieved on Aug. 3, 2018 from https://www.sayernissan.com/new-nissan-titan-xd-sl-inventory-for-sale-idaho-falls.htm.

* cited by examiner

*Primary Examiner* — Mary Ellen Bowman
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a tail lamp housing including a first cutout, a body panel including a second cutout, and at least one light source positioned to transmit light through the first and second cutouts to illuminate a cargo surface. A method according to an exemplary aspect of the present disclosure includes, among other things, providing a cargo member that is moveable between an open position and a closed position and mounting at least one tail lamp adjacent to the cargo member, wherein the tail lamp includes a first cutout. The method further includes forming a second cutout in a body panel and transmitting light through the first and second cutouts to illuminate a (Continued)

cargo surface when the cargo member is in the open position.

19 Claims, 2 Drawing Sheets

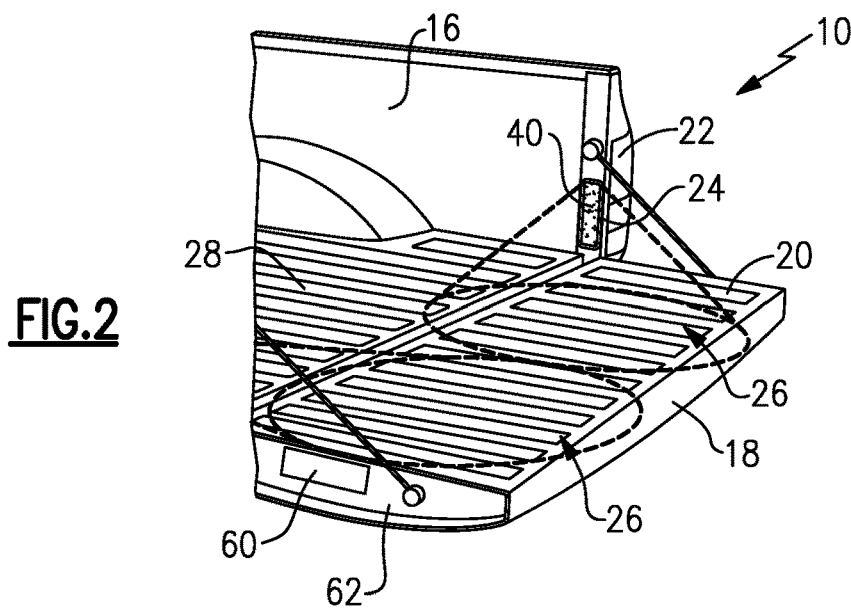
FIG.2
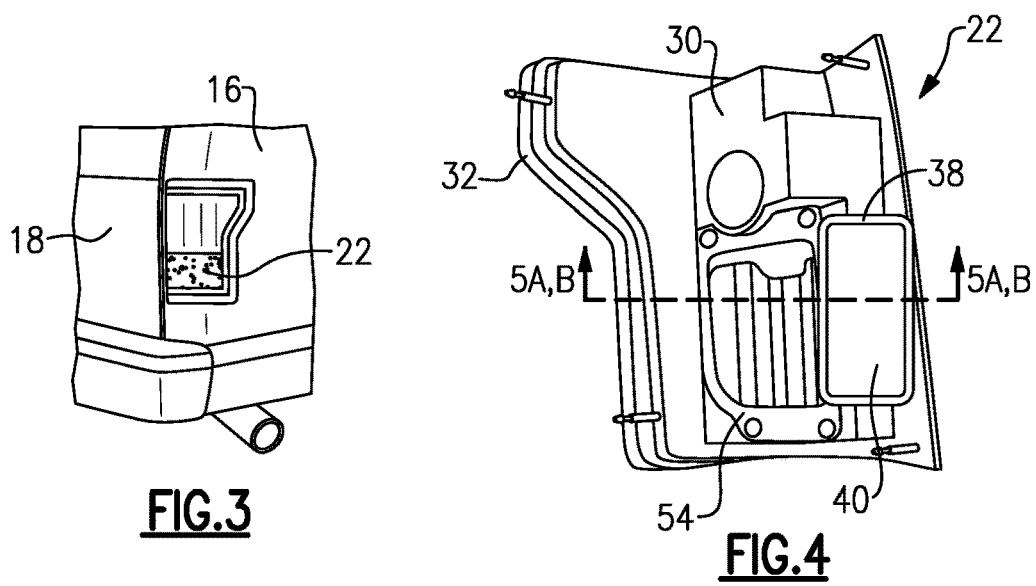
FIG.3
FIG.4
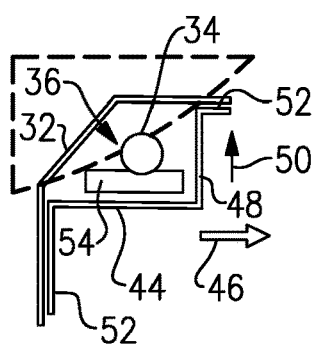
FIG.5A
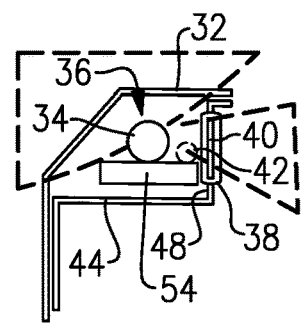
FIG.5B

REAR TAIL LAMP WITH INTEGRATED WINDOW FOR LIGHTING A DEPLOYED TAILGATE

TECHNICAL FIELD

This disclosure relates to an exemplary apparatus and method of providing a tail lamp with an integrated window to illuminate a cargo surface.

BACKGROUND

Vehicles such as pickup trucks, vans, sport utilities, etc. include cargo areas that are accessible by opening tailgates, lift-gates, cargo doors, etc. When accessing these cargo areas in low light conditions, e.g. night time or early morning conditions, the outer edges of the cargo areas are not well lit. These poor visibility conditions can lead to cargo being potentially damaged during loading and unloading operations. Additionally, when cargo surfaces, such as those provided by a lowered tailgate for example, are used as a work surface, reduced light conditions can result in mistakes being made. For example, measurements taken on the work surface may be incorrect, objects may be lost or misplaced, etc. As such, lighting in these areas needs to be improved in a manner that does not add weight, increase cost, or reduce packaging space.

SUMMARY

An apparatus according to an exemplary aspect of the present disclosure includes, among other things, a tail lamp housing including a first cutout, a body panel including a second cutout, and at least one light source positioned to transmit light through the first and second cutouts to illuminate a cargo surface.

In a further non-limiting embodiment of the foregoing apparatus, the first and second cutouts are aligned with each other.

In a further non-limiting embodiment of either of the foregoing apparatus, the apparatus includes a tail lamp lens facing a vehicle exterior, wherein the light source is enclosed in a cavity between the tail lamp lens and tail lamp housing.

In a further non-limiting embodiment of any of the foregoing apparatus, the apparatus includes a secondary lens mounted to the tail lamp housing to cover the first cutout.

In a further non-limiting embodiment of any of the foregoing apparatus, the tail lamp lens and secondary lens are made from a transparent and/or translucent material.

In a further non-limiting embodiment of any of the foregoing apparatus, the at least one light source comprises a tail light lamp.

In a further non-limiting embodiment of any of the foregoing apparatus, the at least one light source comprises at least a tail light lamp and a separate cargo lamp that is configured to transmit light through the first and second cutouts.

In a further non-limiting embodiment of any of the foregoing apparatus, the apparatus includes a tail lamp lens mounted to the tail lamp housing and facing a vehicle exterior, and wherein the tail lamp housing includes a first wall extending in a cross-vehicle direction and a second wall extending in a vehicle longitudinal direction to form a cavity between the tail lamp lens and the first and second walls.

In a further non-limiting embodiment of any of the foregoing apparatus, the first cutout is formed within the second wall such that light from the light source is transmitted through the tail lamp lens in the vehicle longitudinal direction, and wherein the light from the light source is transmitted through the first and second cutouts in the cross-vehicle direction when a tailgate with the cargo surface has been moved to a lowered position.

In a further non-limiting embodiment of any of the foregoing apparatus, the apparatus includes a tailgate that provides the cargo surface and is moveable between a raised position and a lowered position, and wherein light is transmitted through the second cutout only when the tailgate is in the lowered position.

In a further non-limiting embodiment of any of the foregoing apparatus, the apparatus includes a closure mounted to a side of the tailgate to cover the second cutout when the tailgate is in the raised position.

In a further non-limiting embodiment of any of the foregoing apparatus, the closure comprises a reflective material.

In a further non-limiting embodiment of any of the foregoing apparatus, the body panel comprises a sheet metal panel of a cargo area.

An apparatus according to another exemplary aspect of the present disclosure includes, among other things, a tail lamp housing including a first cutout, a tail lamp lens mounted to the tail lamp housing, a body panel including a second cutout that is aligned with the first cutout, and at least one light source positioned within a cavity between the tail lamp housing and the tail lamp lens to transmit light through the first and second cutouts to illuminate a cargo surface.

In a further non-limiting embodiment of any of the foregoing apparatus, the apparatus includes a tailgate that provides the cargo surface and is moveable between a raised position and a lowered position, and wherein light is transmitted through the second cutout to illuminate the tailgate surface only when the tailgate is in the lowered position.

In a further non-limiting embodiment of any of the foregoing apparatus, the apparatus includes a closure mounted to a side of the tailgate to cover the second cutout when the tailgate is in the raised position, and wherein the closure comprises a reflective material.

In a further non-limiting embodiment of any of the foregoing apparatus, the apparatus includes a secondary lens mounted to the tail lamp housing to cover the first cutout, and wherein the at least one light source comprises a common light that is used to illuminate both a tail lamp and the tailgate surface.

A method according to another exemplary aspect of the present disclosure includes the steps of, among other things: providing a cargo member that is moveable between a closed position and an open position; mounting at least one tail lamp adjacent to the cargo member, the tail lamp including a first cutout; forming a second cutout in a body panel; and transmitting light through the first and second cutouts to illuminate a cargo surface when the cargo member is in the open position.

In a further non-limiting embodiment of the foregoing method, wherein the cargo member comprises a tailgate with the open position comprising a lowered position, and wherein the tail lamp comprises a tail lamp housing including the first cutout, a tail lamp lens mounted to the tail lamp housing, and at least one light source positioned within a cavity between the tail lamp housing and the tail lamp lens, and including aligning the second cutout with the first cutout and transmitting light through the second cutout to illuminate the cargo surface only when the tailgate is in the lowered position.

In a further non-limiting embodiment of either of the foregoing methods, the closed position comprises a raised position for the tailgate, the method includes mounting a closure to a side of the tailgate to cover the second cutout when the tailgate is in the raised position, and wherein the closure comprises a reflective material.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 is a perspective partial view of the cargo area of FIG. 1 that shows the tailgate being illuminated by tail lamps incorporating the subject invention.

FIG. 3 is a perspective view of the tail lamp next to a tailgate that is in a raised position.

FIG. 4 is a rear side view of the tail lamp of FIG. 3.

FIG. 5A is a section view of the tail lamp of FIG. 4 that does not include a window cutout.

FIG. 5B is a section view of the tail lamp of FIG. 4 that does include the window cutout.

DETAILED DESCRIPTION

Figure 1:
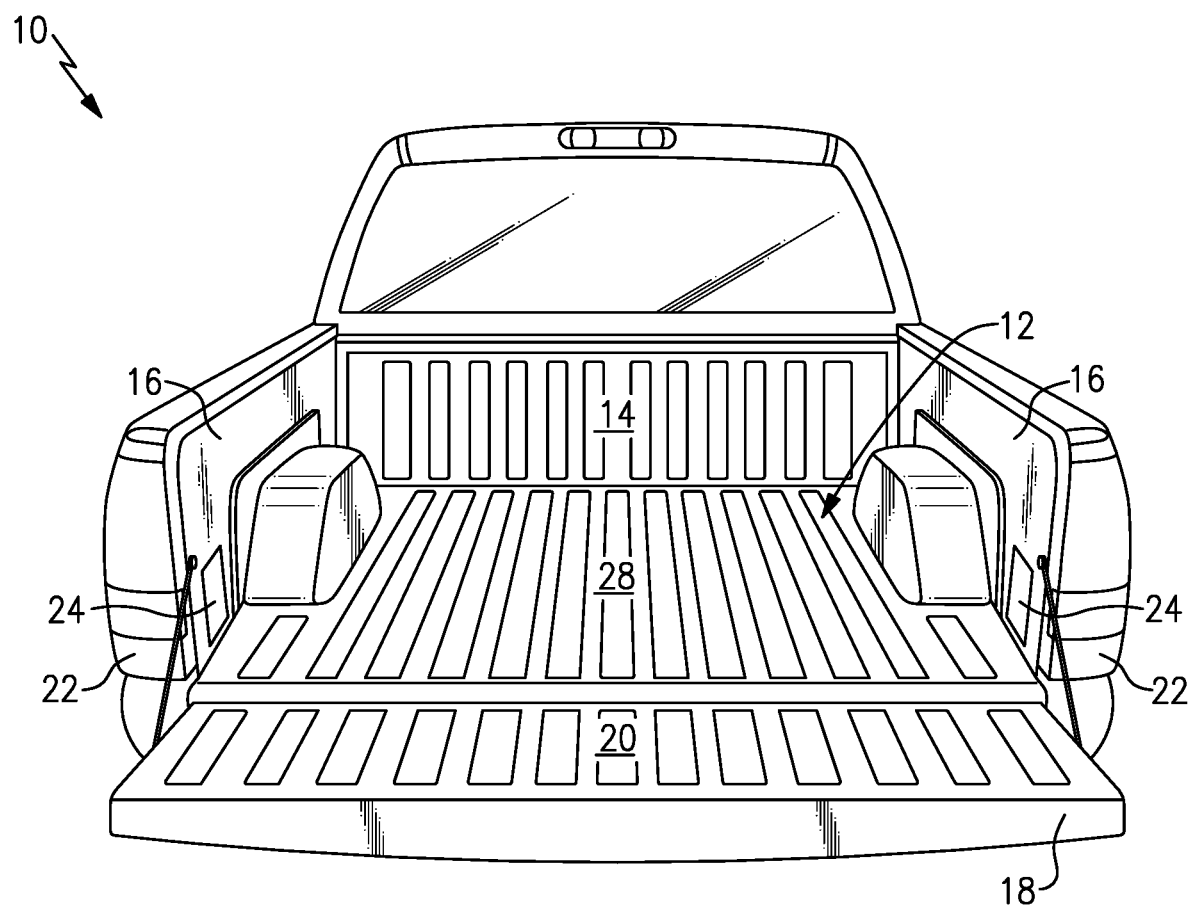
FIG. 1 illustrates an end view of a cargo area for a pickup truck with a tailgate in a lowered position.

This disclosure details exemplary apparatus and methods of providing a tail lamp with an integrated window to illuminate a cargo surface. FIG. 1 shows a pickup truck 10 with a cargo area 12 that is defined by a front wall 14, side walls 16, and a tailgate 18. The tailgate 18 is moveable between an open or lowered position (FIG. 1) and a closed or raised position (FIG. 3). When in the lowered position, the tailgate 18 provides a cargo surface 20 that can comprise a work surface for writing, measuring, and/or holding various tools or objects.

When accessing the cargo area 12 in low light conditions, e.g. night time or early morning conditions, the cargo surface 20 is not well lit. These poor visibility conditions can lead to cargo being potentially damaged during loading and unloading operations, and/or can result in mistakes being made with measurements, calculations, etc. In order to improve illumination of the cargo surface 20, one or more tail lamps 22 are provided that each include an integrated window or cutout that can provide light to illuminate the cargo surface 20 when the tailgate 28 is in the lowered position. The tail lamps 22 are mounted to the side walls 16 at a rear end of the truck 10 adjacent to the tailgate 18 and perform the typical functions of brake lights, running lights, and/or turn signal lights during vehicle operation.

In one example, each side wall 16 includes an opening or cutout 24 that is cut or formed in an inner facing surface of a body panel that forms the side wall 16. In one example, this body panel comprises sheet metal that includes the cutout 24. If a liner or other covering element extends over the inner surface, this element would also include a corresponding cutout. The window cutouts 24 are positioned to overlap the tail lamps 22 such that light can be transmitted through the cutouts 24 to illuminate the cargo surface 20 as shown at 26 in FIG. 2. The cutouts 24 can be of any shape or size. In one example, the cutouts are positioned closer to a cargo floor 28 than to an upper edge of the side walls 16 such that they can more easily illuminate the cargo surface 20.

The tail lamps 22 are shown in greater detail in FIGS. 4 and 5A-5B. Each tail lamp 22 includes a tail lamp housing 30, a tail lamp lens 32 facing a vehicle exterior, and at least one light source 34. The light source 34 can comprise one or more light elements that are incandescent, LED, etc. The light source 34 is enclosed in a cavity 36 that is formed between the tail lamp lens 32 and tail lamp housing 30. In one example, the tail lamp housing 30 includes a first cutout 38 that is aligned with the cutout 24 in the side wall 16 such that there are first 38 and second 24 cutouts that are aligned with each other. The light source 34 transmits light through the first 38 and second 24 cutouts to illuminate the cargo surface 20.

In one example, the tail lamp 22 includes a secondary lens 40 that is mounted to the tail lamp housing 30 to cover the first cutout 38. The tail lamp lens 32 and secondary lens 40 are made from a transparent and/or translucent material. The transparent and/or translucent material can be clear or can have a color such as red, yellow, etc.

In one example, the light source 34 comprises both a cargo lamp that illuminates the cargo surface 20 and a tail light lamp that operates as a brake light, running light, and/or turn signal light. In another example, the at least one light source comprises at least a tail light lamp 34 and a separate cargo lamp 42 (shown in dashed lines in FIG. 5B) that is configured to transmit light through the first 38 and second 24 cutouts.

In one example, the tail lamp housing 30 includes a first wall 44 extending in a lateral or cross-width vehicle direction 46 and a second wall 48 extending in a vehicle longitudinal or vehicle length direction 50. The cavity 36 is formed between an inner surface of the tail lamp lens 32 and the first 44 and second 48 walls. The housing 30 includes additional walls 52 that extend from the first 44 and second 48 walls, and which are flush with the inner surface of the lens 32 to form a tail lamp unit or assembly. A light unit 54 including a heat sink, printed circuit board, and associated electronics is mounted to the housing 30 and supports the light source 34 as known.

In one example, the first cutout 38 is formed within the second wall 48. Light from the light source 34 is transmitted through the tail lamp lens 32 generally in the vehicle longitudinal and reward direction as indicated at 50 in FIG. 5A. The light from the light source 34 is transmitted through the first 38 and second 24 cutouts in the cross-vehicle direction as indicated at 46 in FIG. 5A when the tailgate 18 and cargo surface 20 has been moved to the lowered position. In one example, the window or cutout 38 provides for light transmittance that is perpendicular to the traditional rearward light direction.

In one example, light is transmitted through the second cutout 24 only when the tailgate 18 is in the lowered position. A closure 60 (FIG. 2) is mounted to a side edge 62 of the tailgate 18 to cover the second cutout 24 when the tailgate 18 is in the raised position. This helps prevent reduced light intensity when in the raised position due to the cutout 24, i.e. the closure 60 reduces light leakage through the cutout 24 when the tailgate 18 is in the raised position. In one example, the closure 60 comprises a reflective material which further enhances light intensity when the tailgate 18 is in the raised position, and additionally serves as a reflector for safety purposes when the tailgate 18 is in the lowered position.

An exemplary method includes providing a cargo member, such as the tailgate 18 for example, that is moveable between the closed/raised position and the open/lowered position, mounting at least one tail lamp 22 adjacent to the cargo member, the tail lamp 22 including the first cutout 38, forming the second cutout 24 in a body panel and/or side wall 16, and transmitting light through the first 28 and second 24 cutouts to illuminate the cargo surface 20.

In one example, the method includes cutting the first cutout 38 in the second wall 44 of the lamp housing 30. FIG. 5A shows the second wall 44 without the cutout and FIG. 5B shows the housing 30 after the cutout 38 has been made and the secondary lens 40 has been installed. This provides a configuration where the light source 34 is fully enclosed by translucent/transparent material for water and debris protection, while still allowing light to be transmitted through the lens. An additional method step can include aligning the first 38 and second 24 cutouts with each other.

While a truck bed cargo area and tailgate have been used as an example that incorporates the subject tail lamp, it should be understood that other vehicles such as vans, SUVs, etc. could also include the tail lamp 22 to illuminate a cargo surface and/or work surface.

The subject invention modifies an existing a tail lamp component to include an integrated window/cutout to illuminate a cargo surface. This eliminates the need for additional light components and therefore reduces cost, weight, etc. It also does not require batteries or additional light bulbs that need to be replaced. Further, when the tailgate or cargo door is closed, the design of the vehicle is not interrupted with a visible light source. Further, the closure member reflective surface re-directs light that would escape through the window/cutout to increase light intensity, while also functioning as a safety reflector when the tailgate is lowered. Also, the unit is self-contained and waterproof. The use of this tail lamp can also allow any existing bed lights to be moved forward to better light the entire cargo area.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
a tail lamp housing including a first cutout;
a tail lamp lens mounted to the tail lamp housing and facing a vehicle exterior, and wherein the tail lamp housing includes a first wall extending in a cross-vehicle direction and a second wall extending in a vehicle longitudinal direction to form a cavity between the tail lamp lens and the first and second walls;
a body panel including a second cutout; and
at least one light source positioned to transmit light through the first and second cutouts to illuminate a cargo surface, and wherein the first cutout is formed within the second wall such that light from the light source is transmitted through the tail lamp lens in the vehicle longitudinal direction, and wherein the light from the light source is transmitted through the first and second cutouts in the cross-vehicle direction when a tailgate with the cargo surface has been moved to a lowered position.

2. The apparatus according to claim 1, wherein the first and second cutouts are aligned with each other.

3. The apparatus according to claim 1, wherein the at least one light source is enclosed in the cavity between the tail lamp lens and tail lamp housing.

4. The apparatus according to claim 3, including a secondary lens mounted to the tail lamp housing to cover the first cutout.

5. The apparatus according to claim 4, wherein the tail lamp lens and secondary lens are made from a transparent and/or translucent material.

6. The apparatus according to claim 1, wherein the at least one light source comprises a tail light lamp.

7. The apparatus according to claim 1, wherein the at least one light source comprises at least a tail light lamp and a separate cargo lamp that is configured to transmit light through the first and second cutouts.

8. An apparatus, comprising:
a tail lamp housing including a first cutout;
a body panel including a second cutout;
at least one light source positioned to transmit light through the first and second cutouts to illuminate a cargo surface; and
a tailgate that provides the cargo surface and is moveable between a raised position and a lowered position, and wherein light is transmitted through the second cutout only when the tailgate is in the lowered position.

9. The apparatus according to claim 8, including a closure mounted to a side of the tailgate to cover the second cutout when the tailgate is in the raised position.

10. The apparatus according to claim 9, wherein the closure comprises a reflective material.

11. The apparatus according to claim 1, wherein the body panel comprises a sheet metal panel of a cargo area.

12. An apparatus, comprising:
a tail lamp housing including a first cutout;
a tail lamp lens mounted to the tail lamp housing;
a body panel including a second cutout that is aligned with the first cutout;
at least one light source positioned within a cavity between the tail lamp housing and the tail lamp lens to transmit light through the first and second cutouts to illuminate a cargo surface; and
a tail gate that provides the cargo surface and is moveable between a raised position and a lowered position, and wherein light is transmitted through the second cutout to illuminated the cargo surface only when the tailgate is in the lowered position.

13. The apparatus according to claim 12, including a closure mounted to a side of the tailgate to cover the second cutout when the tailgate is in the raised position, and wherein the closure comprises a reflective material.

14. The apparatus according to claim 12, including a secondary lens mounted to the tail lamp housing to cover the first cutout, and wherein the at least one light source comprises a common light that is used to illuminate both a tail lamp and the cargo surface.

15. A method comprising:
providing a cargo member that is moveable between a closed position ad an open position, and wherein the cargo member comprises a tailgate with the open position comprising a lowered position;
mounting at least one tail lamp adjacent to the cargo member, the tail lamp including a first cutout, and the at least one tail lamp comprises a tail lamp housing that includes the first cutout;
mounting a tail lamp lens to the tail lamp housing;
positioning at least one light source within a cavity between the tail lamp housing and the tail lamp lens;
forming a second cutout in a body panel and aligning the second cutout with the first cutout; and
transmitting light through the first and second cutouts to illuminate a cargo surface when the cargo member is in the open position, and wherein light is transmitted through the second cutout to illuminate the cargo surface only when the tailgate is in the lowered position.

16. The method according to claim 15, wherein the closed position comprises a raised position for the tailgate, and including mounting a closure to a side of the tailgate to cover the second cutout when the tailgate is in the raised position, and wherein the closure comprises a reflective material.

17. The method according to claim 15, including providing brake light, running light, and/or turn signal light functions during vehicle operation with the tail lamp.

18. The apparatus according to claim 12, wherein the at least one light source provides brake light, running light, and/or turn signal light functions during vehicle operation.

19. The apparatus according to claim 1, wherein the at least one light source is positioned within the tail lamp housing and provides brake light, running light, and/or turn signal light functions during vehicle operation.

* * * * *

UNITED STATES PATENT AND TRADEMARK OFFICE
CERTIFICATE OF CORRECTION

Page 1 of 1

PATENT NO. : 10,787,118 B2
APPLICATION NO. : 16/137657
DATED : September 29, 2020
INVENTOR(S) : Andrew Augusty It is certified that error appears in the above-identified patent and that said Letters Patent is hereby corrected as shown below:

In the Claims

In Claim 15, Column 7, Line 6; replace "closed postion ad an open" with --closed position and an open--

In Claim 15, Column 7, Line 10-11; replace "and the at least one" with --and wherein the at least one--

Signed and Sealed this
First Day of March, 2022

Drew Hirshfeld
*Performing the Functions and Duties of the
Under Secretary of Commerce for Intellectual Property and
Director of the United States Patent and Trademark Office*